US011286206B2

(12) United States Patent
Hilliard et al.

(10) Patent No.: US 11,286,206 B2
(45) Date of Patent: Mar. 29, 2022

(54) CEMENTITIOUS COMPOSITIONS USING WASTE MATERIALS AND METHODS OF USING SAME

(71) Applicant: Material Solution Services, Inc., Northampton, PA (US)

(72) Inventors: Brian M. Hilliard, Kutztown, PA (US); Michael C. Ciccone, Sr., Orefield, PA (US); Steven J. Kolbe, Orefield, PA (US); Deborah Staas-Haught, Millville, NJ (US); John Thomas Fox, Sellersville, PA (US); Pan Ni, Bethlehem, PA (US); Kun Yang, Troy, NY (US)

(73) Assignee: Material Solution Services, Inc., Northampton, PA (US)

( * ) Notice: Subject to any disclaimer, the term of this patent is extended or adjusted under 35 U.S.C. 154(b) by 163 days.

(21) Appl. No.: 16/824,294

(22) Filed: Mar. 19, 2020

(65) Prior Publication Data

US 2020/0317575 A1    Oct. 8, 2020

Related U.S. Application Data

(60) Provisional application No. 62/830,779, filed on Apr. 8, 2019.

(51) Int. Cl.
*C04B 28/04* (2006.01)
*C04B 18/04* (2006.01)
*C04B 7/02* (2006.01)
*C04B 18/08* (2006.01)
*C04B 28/26* (2006.01)

(52) U.S. Cl.
CPC ............... *C04B 28/04* (2013.01); *C04B 7/02* (2013.01); *C04B 18/0427* (2013.01); *C04B 18/08* (2013.01); *C04B 28/26* (2013.01)

(58) Field of Classification Search
CPC ......... C04B 7/02; C04B 12/04; C04B 14/106; C04B 14/22; C04B 18/0427; C04B 18/08; C04B 22/085; C04B 22/124; C04B 28/04; C04B 28/26; C04B 2103/10; C04B 2111/00724; C04B 2111/00767; Y02W 30/91
See application file for complete search history.

(56) References Cited

U.S. PATENT DOCUMENTS

| | | | |
|---|---|---|---|
| 5,173,115 | A | 12/1992 | Glynn, Jr et al. |
| 5,288,171 | A | 2/1994 | Smith et al. |
| 5,320,450 | A | 6/1994 | Smith |
| 5,333,738 | A | 8/1994 | Fuchs et al. |
| 5,350,451 | A | 9/1994 | Patterson |
| 5,445,330 | A | 8/1995 | Shokry Rashwan et al. |
| 5,525,153 | A | 6/1996 | Cosola |
| 5,855,664 | A | 1/1999 | Bielecki et al. |
| 6,382,425 | B1 | 5/2002 | Brickner et al. |
| 7,815,729 | B2 | 10/2010 | Cummings et al. |
| 9,662,630 | B2 | 5/2017 | Bisque et al. |
| 2003/0019795 | A1 | 1/2003 | Yilmaz |
| 2003/0167970 | A1 | 9/2003 | Polston |
| 2004/0148876 | A1 | 8/2004 | McManus et al. |

FOREIGN PATENT DOCUMENTS

| | | |
|---|---|---|
| CN | 106167689 A | 11/2016 |
| EP | 0447530 A1 | 9/1991 |

OTHER PUBLICATIONS

Clark et al. "Beneficial Use Of C&D Recovered Screen Material In Residential Applications: A Case Study", Proceedings of the Annual International Conference on Soils, Sediments, Water and Energy: vol. 11, Article 25. (Year: 2010).*
Kaushik et al., "Usage of C&D Waste in Concrete as a Replacement of Natural Aggregate," 14th NCB International Seminar on Cement and Building Materials, Manekshaw Centre, New Delhi, India, Dec. 1-4, 2015, 10 pages.
Kuosa, "Reuse of Recycled Aggregates and Other C&D Wastes," Research Report VTT-R-05984-12, VTT Technical Research Centre of Finland Ltd., Espoo, Finland, Nov. 5, 2012, 72 pages.

* cited by examiner

*Primary Examiner* — Anthony J Green
(74) *Attorney, Agent, or Firm* — Quarles & Brady LLP; James J. Aquilina

(57) ABSTRACT

The present application discloses various cementitious compositions that incorporate waste materials therein. In some embodiments, the waste materials incorporated in the compositions are mixed construction and demolition fines, including but not limited to small pieces of glass, wood, metal, drywall, cardboard, masonry, and other architectural material and waste materials. Various methods for using said compositions are also disclosed.

20 Claims, 4 Drawing Sheets

CEMENTITIOUS COMPOSITIONS USING WASTE MATERIALS AND METHODS OF USING SAME

CROSS-REFERENCE TO RELATED APPLICATION(S)

This application claims domestic benefit to U.S. Provisional Patent Application No. 62/830,779, filed Apr. 8, 2019, which is incorporated by reference herein in its entirety.

BACKGROUND

This disclosure relates generally to the field of cementitious compositions and methods of using same, and more particularly to the field of cementitious compositions using waste materials as a solid fill, and methods of using same.

As landfill space near large population centers becomes scarcer and societal demand for sustainable waste-management solutions increases, improved strategies for waste disposal, management, and re-use will become increasingly desirable. Accordingly, the present disclosure describes cementitious compositions comprising waste materials and methods of using same for various purposes.

SUMMARY OF THE DISCLOSURE

Presently, landfilled materials include debris from construction and demolition ("C&D") projects. C&D debris processing facilities exist to capture and sort various materials that comprise C&D debris—e.g., wood, metal, drywall, cardboard, concrete, asphalt, masonry, ceramics, paper, and insulation—for potential re-use applications. These various materials are typically captured using multiple sorting and screening operations, until all that remains are recovered screen materials ("RSM"), which include various portions of the C&D debris, dirt, and other components of dimensions below a certain size. These C&D "fines," which are too small to be effectively sorted and recycled, are presently delivered to landfills for disposal.

In addition, existing recycling methods for glass typically require that recovered glass be sorted and segregated by color. Due to complexities associated with optically sorting small glass particulates by color, and restrictions on the re-use of this "mixed glass," these mixed glass "fines" are also typically delivered to landfills for disposal.

Proposals have been made to re-use RSM and mixed glass fines in various building materials, and at least some states in the United States have issued laws and regulations directed to the use of these materials. Examples of concerns identified by state legislatures and administrative bodies include structural stability and chemical quality and stability, including requirements that materials be tested for, e.g., the presence of volatile organic compounds (VOCs), semi-volatile compounds (SVOCs), and/or pesticides.

As described in detail below, the inventors have developed novel compositions that include RSM, glass fines, water, and a combination of cementitious binders that provide both desired compressive strength properties and waste stabilization characteristics. The cementitious binders are able to provide both mechanical strength and environmental integrity in the resulting product.

For purposes of the specification and claims, the term "Recovered Screen Materials" (abbreviated "RSM") means either a homogenous or heterogenous mixture of various materials used in construction applications, each individual piece being less than 2 inches (5.08 cm) in all dimensions.

For purposes of the specification and claims, the term "Mixed Glass Fines" (abbreviated "MGF") means either a homogenous or heterogenous mixture of various glass materials, containing less than 5% by weight of other residual material (e.g., paper and plastic), each individual piece being less than 2.00 inches (5.08 cm) in all dimensions.

Aspects of the disclosure include:

Aspect 1: A cementitious composition, the cementitious composition having a total weight, the cementitious composition comprising: a binder in an amount of between 2.5-10% by weight of the total weight of the cementitious composition, the binder comprising Portland Cement; a disperser in an amount of between 20-60% by weight of the total weight of the cementitious composition; and a waste material composition, the waste material composition having a weight, wherein the waste material composition includes Recovered Screen Materials in an amount of between 50-100% by weight of the weight of the waste material composition.

Aspect 2: The cementitious composition of Aspect 1, wherein the waste material composition includes Mixed Glass Fines in an amount of between 0.01-50% by weight of the weight of the waste material composition.

Aspect 3: The cementitious composition of either of Aspect 1 or Aspect 2, wherein the waste material composition includes foundry sand in an amount of between 0.01-20% by weight of the weight of the waste material composition.

Aspect 4: The cementitious composition of any of Aspects 1-3, wherein the Recovered Screen Materials are present in an amount of between 70-98% by weight of the weight of the waste material composition.

Aspect 5: The cementitious composition of any of Aspects 1-4, wherein the Recovered Screen Materials are present in an amount of between 75-85% by weight of the weight of the waste material composition.

Aspect 6: The cementitious composition of any of Aspects 2-5, wherein the Mixed Glass Fines are present in an amount of between 15-25% by weight of the weight of the waste material composition.

Aspect 7: The cementitious composition of any of Aspects 1-6, wherein the disperser is water.

Aspect 8: The cementitious composition of any of Aspects 1-7, wherein the Portland Cement is present in an amount of between 2.5-5% by weight of the total weight of the cementitious composition.

Aspect 9: The cementitious composition of any of Aspects 1-8, the binder further comprising a pozzolan.

Aspect 10: The cementitious composition of Aspect 9, wherein the pozzolan is present in an amount of between 0.1-5% by weight of the total weight of the cementitious composition.

Aspect 11: The cementitious composition of Aspect 10, wherein the pozzolan is metakaolin and/or fly ash.

Aspect 12: The cementitious composition of any of Aspects 1-11, the binder further comprising a modified alkali silicate.

Aspect 13: The cementitious composition of Aspect 12, wherein the modified alkali silicate is present in an amount of between 0.01-2% by weight of the total weight of the cementitious composition.

Aspect 14: The cementitious composition of any of Aspects 1-13, further comprising an accelerant.

Aspect 15: The cementitious composition of Aspect 14, wherein the accelerant is present in an amount of between 0.01-1% by weight of the total weight of the cementitious composition.

Aspect 16: The cementitious composition of either of Aspect 14 or Aspect 15, wherein the accelerant is present in an amount of between 0.01-0.10% by weight of the total weight of the cementitious composition.

Aspect 17: The cementitious composition of any of Aspects 14-16, wherein the accelerant is calcium chloride or calcium nitrate.

Aspect 18: A method of using the cementitious composition of any of Aspects 1-17, the method comprising using the cementitious composition as a stable fill or levelling material on a plot of land.

BRIEF DESCRIPTION OF THE DRAWINGS

The present invention will hereinafter be described in conjunction with the appended drawing figures, wherein like numerals denote like elements.

DETAILED DESCRIPTION OF THE PREFERRED EMBODIMENTS

Figure 1:
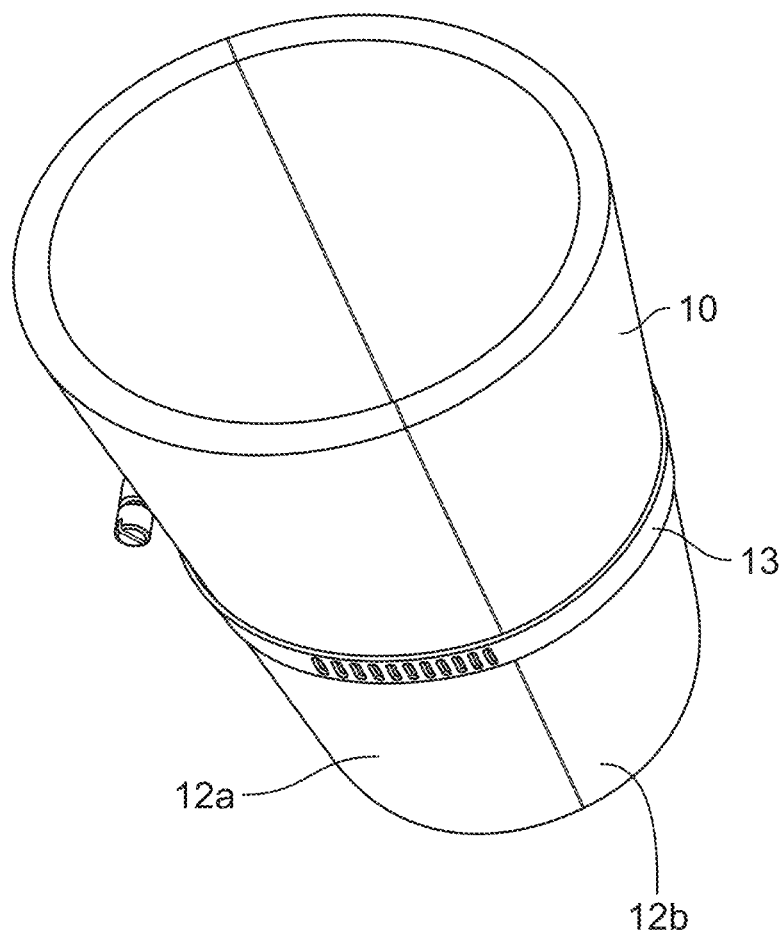
FIG. 1 is an image of a mold used to create cylindrically-shaped composites, in accordance with the present disclosure.

The ensuing detailed description provides exemplary embodiments only, and is not intended to limit the scope, applicability, or configuration of the present disclosure. Rather, the ensuing detailed description of the preferred exemplary embodiments will provide those skilled in the art with an enabling description for implementing the preferred exemplary embodiments of the disclosure. It should be understood that various changes may be made in the function and arrangement of elements without departing from the spirit and scope of the invention, as set forth in the appended claims.

To aid in describing the disclosed embodiments or claiming the invention, directional terms may be used in the specification and/or claims to describe portions of the present disclosure and/or invention (e.g., upper, lower, left, right, etc.). These directional definitions are merely intended to assist in describing the embodiments and claiming the invention, and are not intended to limit the disclosed embodiments or claimed invention in any way. In addition, reference numerals that are introduced in the specification in association with a drawing figure may be repeated in one or more subsequent figures without additional description in the specification, in order to provide context for other features.

Cementitious Compositions

The inventors have developed cementitious compositions and methods of using same that have advantageous qualities over such compositions and methods which are known in the prior art. In one respect, the cementitious compositions according to the present disclosure include a waste material composition including RSM (and optionally MGF), a disperser, and a binder. The waste material composition, which consists of the dry waste materials including RSM and optionally MGF, has a weight. The cementitious composition, which includes the waste material composition, binder, disperser, and optionally other ingredients, has a total weight.

In some embodiments, the RSM is present in an amount of between 50-100% by weight of the weight of the waste material composition. In additional embodiments, the RSM is present in an amount of between 70-98% by weight of the weight of the waste material composition. In further additional embodiments, the RSM is present in an amount of between 75-85% by weight of the weight of the waste material composition. In some embodiments, MGF is also present in the waste material composition in an amount of between 0.01-50% by weight of the weight of the waste material composition. In additional embodiments, MGF is present in the waste material composition in an amount of between 15-25% by weight of the weight of the waste material composition.

In alternate embodiments, the waste material composition may further include foundry sand from vacuum processes and/or sodium silicate-bonded processes, in an amount of between 0.01-20% by weight of the weight of the waste material composition. In additional embodiments, foundry sand is present in the waste material composition in an amount of between 5-15% by weight of the weight of the waste material composition.

The disperser is, for example, tap water. In some embodiments, the disperser is present in an amount of between 20-60% by weight of the total weight of the cementitious composition. In additional embodiments, the disperser is present in an amount of between 25-55% by weight of the total weight of the cementitious composition. In additional embodiments, the disperser is present in an amount of between 30-55% by weight of the total weight of the cementitious composition.

The binder includes Portland Cement, and may be homogenous or a mixture including Portland Cement and other ingredients. The inventors have determined that Portland Cement, Type III, is particularly well-suited for these applications, but it should be understood that any type of Portland Cement may be used in accordance with the present disclosure. In some embodiments, the binder is present in an amount of between 2.5-10% by weight of the total weight of the cementitious composition. In additional embodiments, the Portland Cement is present in an amount of between 2.5-5% by weight of the total weight of the cementitious composition. In yet further embodiments, the Portland Cement is present in an amount of between 3.0-4.5% by weight of the total weight of the cementitious composition.

The binder may optionally further include one or more natural and/or artificial pozzolans or pozzolanic materials, for example metakaolin, fly ash, silica fume, blast-furnace slag, and/or burned organic matter residues rich in silica, such as rice husk ash. In some embodiments, the pozzolan(s) is present in an amount of between 0.1-5% by weight of the total weight of the cementitious composition. In some embodiments, metakaolin is present in an amount of between 0.2-1% by weight of the total weight of the cementitious composition. In yet further embodiments, metakaolin is present in an amount of between 0.25-0.5% by weight of the total weight of the cementitious composition. In some embodiments, fly ash may be present in an amount of between 0.1-3% by weight of the total weight of the cementitious composition.

The binder may optionally further include modified alkali silicate. In some embodiments, the modified alkali silicate is present in an amount of between 0.01-2% by weight of the total weight of the cementitious composition. In additional embodiments, the modified alkali silicate is present in an amount of between 0.1-1% by weight of the total weight of the cementitious composition.

The binder may optionally further include one or more accelerants, for example calcium chloride and/or calcium nitrate. In some embodiments, the accelerant is present in an amount of between 0.01-1% by weight of the total weight of the cementitious composition. In additional embodiments, the accelerant is present in an amount of between 0.01-0.10% by weight of the total weight of the cementitious composition.

Methods of Material Blending and Mixing

Figure 7:
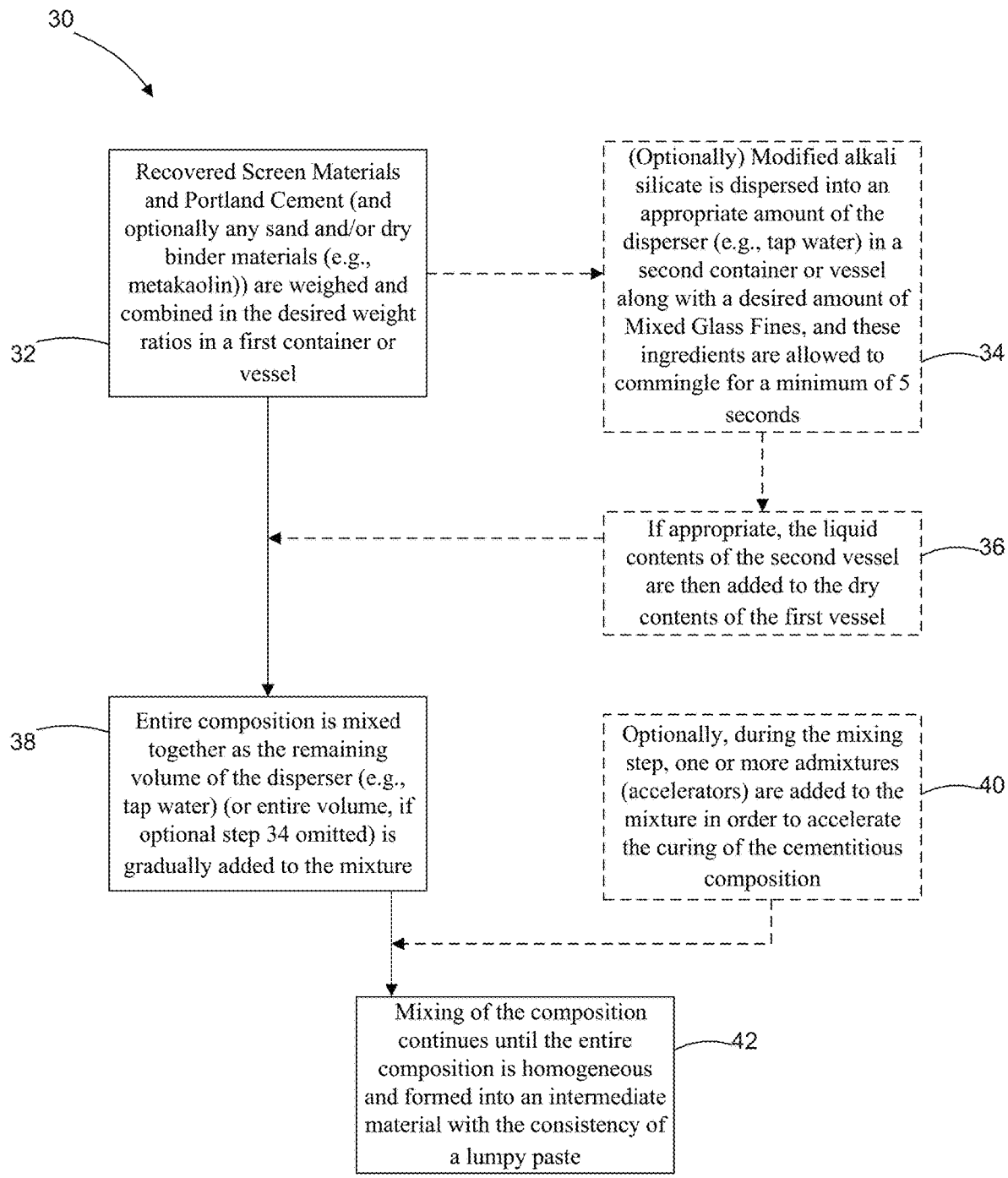
FIG. 7 is a flowchart of an exemplary mixing method for cementitious compositions according to the present disclosure.

In another respect, the inventors have developed a novel method for mixing the components of the cementitious compositions according to the present disclosure. As shown in the flowchart of FIG. 7, the method 30 begins with the RSM and Portland Cement, and optionally any foundry sand and/or dry binder materials (e.g., metakaolin) being weighed and combined in the desired weight ratios in a first container or vessel (see step 32). Optionally in parallel with step 32, the desired amount of modified alkali silicate is dispersed into an appropriate amount of the disperser (e.g., tap water) in a second container or vessel along with a desired amount of MGF, and these ingredients are allowed to commingle for a minimum of 5 seconds (see step 34). If appropriate, the liquid contents of the second vessel are then added to the dry contents of the first vessel (see step 36). The entire composition is then mixed together as the remaining volume of the disperser (e.g., tap water) is gradually added to the mixture (see step 38). The volume of the disperser added during the mixing step may constitute approximately 80-98% by weight of the total amount of the disperser that will be present in the final cementitious composition, or constitutes 100% thereof if both the modified alkali silicate and MGF are omitted from the final cementitious composition. Optionally, during the mixing step, one or more admixtures (accelerators) are added to the mixture in order to accelerate the curing of the cementitious composition (see step 40). Mixing of the composition continues until the entire composition is homogeneous and formed into an intermediate material with the consistency of a lumpy paste (see step 42). The cementitious composition may then be poured and formed as desired. It should be understood that other methods for mixing the components of the cementitious compositions according to the present disclosure are possible.

Performance Testing and Characteristics

In one respect, the compositions according to the present disclosure are capable of demonstrating physical performance characteristics sufficient to permit their use as a general fill embankment material after a suitable period of curing. The compressive strength tests were carried out with an ADR Touch Control Compression machine, manufactured by ELE International (US), of Loveland, Colo., USA. Duplicate samples were tested at each curing time interval for each specific formula.

Figure 2:
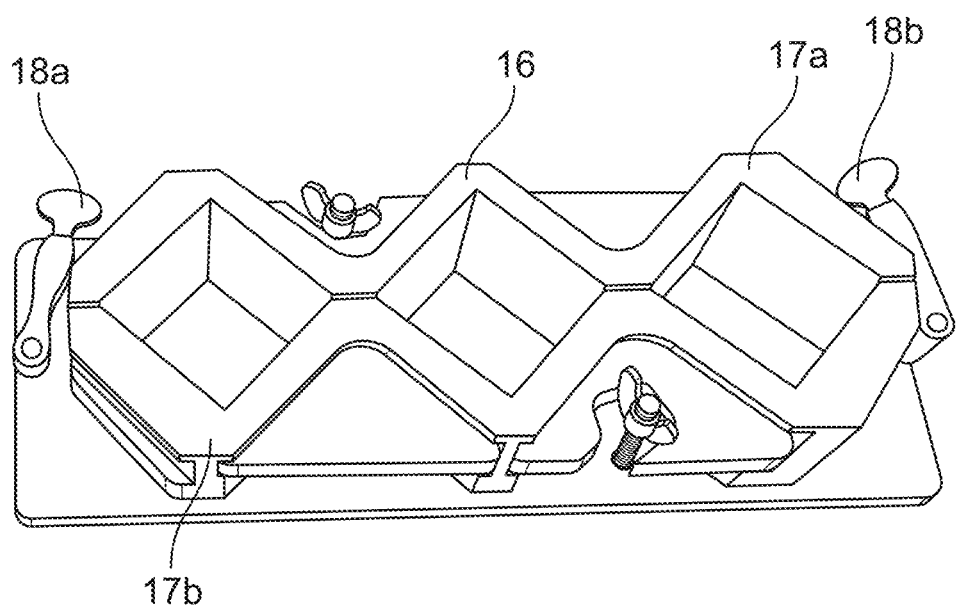
FIG. 2 is an image of a mold used to create cubic-shaped composites, in accordance with the present disclosure.

For purposes of testing the cementitious compositions, two molds 10,16 were created. As shown in FIG. 2, mold 16 can simultaneously produce up to three cubic samples that each measure 2.00 inches (5.08 centimeters) in all dimensions. In this embodiment, the mold 16 is comprised of mold halves 17a,17b that are releasably held together via fasteners 18a,18b. It should be understood that other types of molds would be suitable to create the cubic test samples of the cementitious compositions. Further, as shown in FIG. 1, mold 10 produces a cylindrical sample that measure 8.00 inches (20.32 centimeters) in height and 4 inches (10.16 centimeters) in diameter. In this embodiment, the mold 10 is comprised of a length of pipe that has been cut in half lengthwise to form separable mold halves 12a,12b, which are releasably held together via a hose clamp 13. It should be understood that other types of molds having other types of releasable clamp(s) would be suitable to form the cylindrical test samples of the cementitious compositions.

In an exemplary method according to the present disclosure, the molds 10,16 are filled with the mixed cementitious composition using a metal spatula in approximate ⅓ layers, with packing steps using a rubber bar following each fill layer. The solid mixed compositions are then struck off at the height of the respective mold 10,16. The compositions are then allowed to cure in the mold 10,16 at room temperature prior to the compressive tests. In addition, a selection of samples was chilled at approximately 4.0 degrees Celsius (39.2 degrees Fahrenheit) in a laboratory refrigerator in order to mimic typical winter weather condition in the Northeastern United States. In these compositions, admixtures were included to accelerate the curing process. The inventors have discovered that with some compositions according to the present disclosure, it may be desirable to insulate the samples to at or above 4.44 degrees Celsius (40.0 degrees Fahrenheit) to ensure proper curing. This insulative effect may be achieved via insulative coverings that are laid over or wrapped around the concrete as it cures.

Samples produced by the 2-inch cubic mold 16 were tested for compressive strength at 24 hours, 48 hours, and 28 days after mixing and pouring. Table 1, below, shows the results of compressive strength tests that were performed on these various sample compositions at these time intervals. The density of each sample was calculated and recorded based on the weight of each sample, divided by its volume. The volume was determined to be 8.00 cubic inches (131.10 cubic centimeters) for samples produced using the cubic mold 16, and 100.53 cubic inches (1647.39 cubic centimeters) for samples produced using the cylindrical mold 10. Samples produced with the 8-inch by 4-inch cylindrical mold 10 were tested for compressive strength following 7 days, 28 days, and 56 days of curing.

TABLE 1

| Formulation No. | Formulation information | Density (g/cm³) | 1st day strength (psi) | 2nd day strength (psi) | 28th day strength (psi) |
|---|---|---|---|---|---|
| ① | 80% RSM, 20% MGF, 4% Portland cement III, 0.5% metakaolin, 0.1% modified alkali-silicate binder, 0.023% accelerant, 33% tap water | 0.63 ± 0.07 | 36 ± 0.4 | 46 ± 0.4 | 70 ± 19 |
| ② | 80% RSM, 20% MGF, 4.5% Portland cement III, 0.5% metakaolin, 1% modified al-silicate binder, 50% tap water | 0.78 ± 0.09 | 41 ± 1.4 | 47 ± 1.4 | 54 ± 4.4 |
| ③ | 80% RSM, 20% MGF, 3% Portland cement III, 0.4% metakaolin, 0.1% modified alkali-silicate binder, 50% tap water | 0.74 ± 0.06 | 44 ± 7.3 | 44 ± 0.9 | 79 ± 5.4 |
| ④ | 80% RSM, 20% MGF, 2.5% Portland cement III, 0.25% metakaolin, 0.1% modified alkali-silicate binder, 0.029% accelerant, 50% tap water | 0.81 ± 0.07 | 26 ± 0.9 | 41 ± 0.7 | 44 ± 2.6 |

Figure 3A:
FIG. 3A is a side view of a composite formed according to a first exemplary composition according to the present disclosure.
Figure 4A:
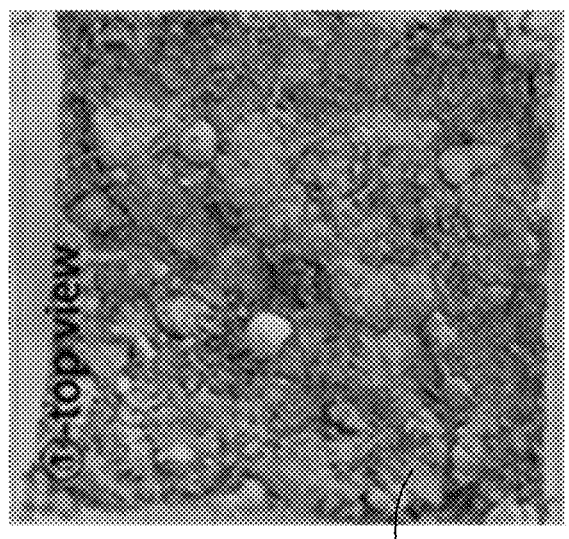
FIG. 4A is a side view of a composite formed according to a second exemplary composition according to the present disclosure.
Figure 3B:
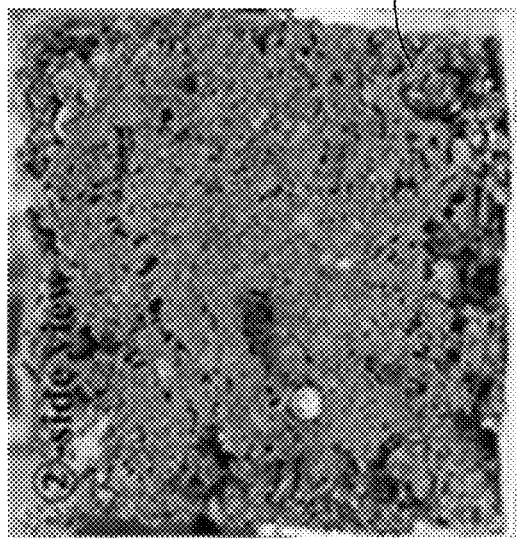
FIG. 3B is a top view thereof.
Figure 4B:
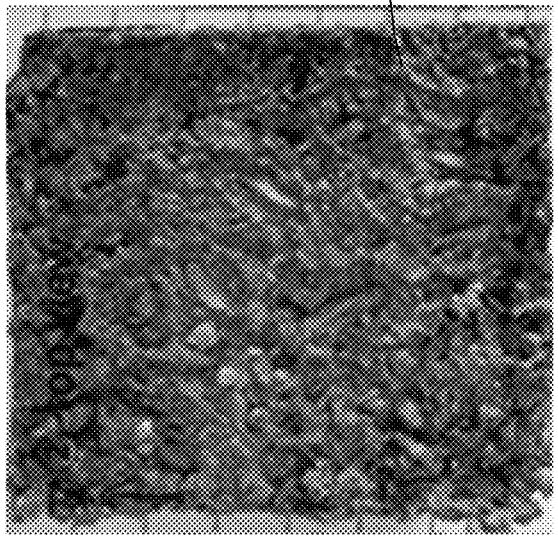
FIG. 4B is a top view thereof.
Figure 5A:
FIG. 5A is a side view of a composite formed according to a third exemplary composition according to the present disclosure.
Figure 5B:
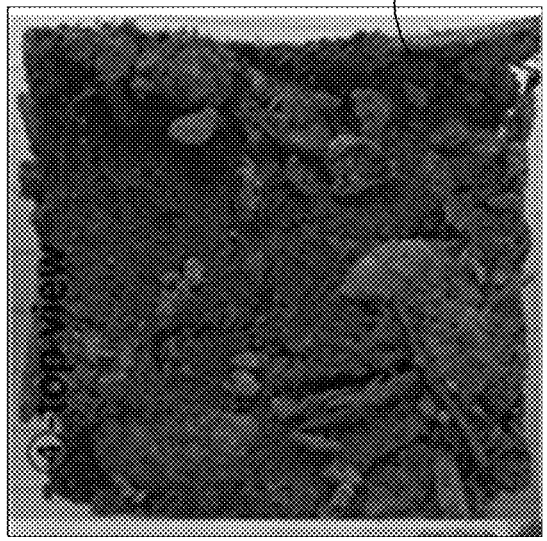
FIG. 5B is a top view thereof.
Figure 6A:
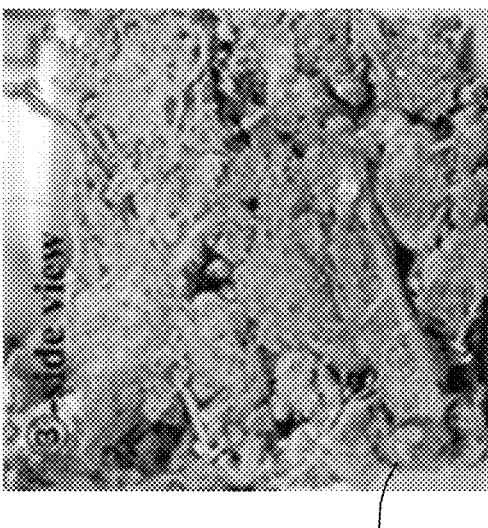
FIG. 6A is a side view of a composite formed according to a fourth exemplary composition according to the present disclosure.
Figure 6B:
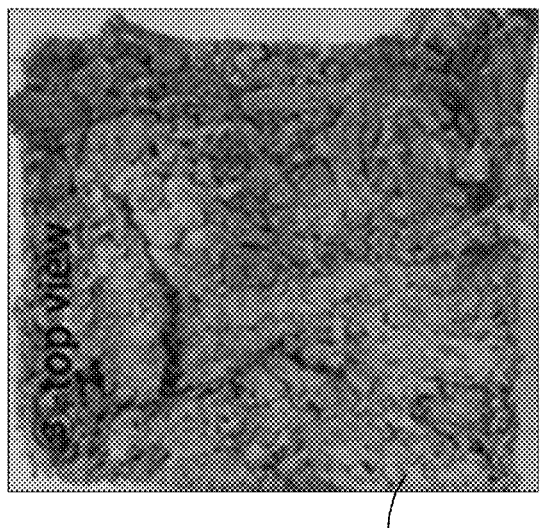
FIG. 6B is a top view thereof.

FIGS. 3A-6B show side and top views, respectively, of samples of each of the four compositions according to Formulations 1-4 of Table 1, above, after setting. FIGS. 3A and 3B are side and top views, respectively, of a sample 20 according to Formulation 1 of Table 1, above, after setting. FIGS. 4A and 4B are side and top views, respectively, of a sample 22 according to Formulation 2 of Table 1, above, after setting. FIGS. 5A and 5B are side and top views, respectively, of a sample 24 according to Formulation 3 of Table 1, above, after setting. FIGS. 6A and 6B are side and top views, respectively, of a sample 26 according to Formulation 4 of Table 1, above, after setting. All of the above photos were taken approximately 48 hours after pouring of the compositions into the mold 16.

In one respect, the various formulations in accordance with the present disclosure are capable of satisfying minimum required compressive strengths for site reclamation purposes, for example by meeting the unconfined compressive strength requirements of a "Very Stiff" material (i.e., 29 psi) as defined in the publication *Soil Mechanics in Engineering Practice 3rd Edition* by K. Terzaghi, R. Peck, and G. Mesri (1996). In another respect, the various formulations in accordance with the present disclosure are capable of meeting the necessary 48-hour compressive strength of 40 psi for mine reclamation, as required by the Commonwealth of Pennsylvania Department of Environmental Protection in its General Permit WMGR085 document entitled "PROCESSING PRIOR TO BENEFICIAL USE OF FRESHWATER, BRACKISH AND MARINE DREDGE MATERIAL, CEMENT KILN DUST, LIME KILN DUST, COAL ASH, AND COGENERATION ASH BY SCREENING, MECHANICAL BLENDING, AND COMPACTION FOR USE IN MINE RECLAMATION" (which incorporates therein the compressive strength standards of ASTM D1633, entitled "Standard Test Methods for Compressive Strength of Molded Soil-Cement Cylinders"). The entire contents of each of the documents identified in this paragraph are incorporated herein by reference as if set forth in their entireties. In yet another respect, the various formulations in accordance with the present disclosure are capable of satisfying minimum required compressive strengths for various additional applications, for example desired compressive strengths greater than 5 psi, 10 psi, or 20 psi.

In another respect, the compositions according to the present disclosure—once cured for a desired period of time, for example, 48 hours, 7 days, 14 days, or 28 days—are capable of passing one or more established leaching test procedures. In some embodiments, the compositions are capable of passing the *Test Method* 1311: *Toxicity Characteristic Leaching Procedure* ("TCLP"), published by the United States Environmental Protection Agency in July 1992, the contents of which are incorporated herein by reference as if set forth in their entirety.

Additional Methods of Using Compositions

The compositions formed according to the present disclosure can be used in various applications. For example, these compositions could be used as stable fill material to fill abandoned quarries, fill holes on unlevel tracts of undeveloped or previously-developed land, and reclaim brownfields. In alternate embodiments, these compositions could be prepared and sold as a concrete mix for packaged or bulk re-sales. In further alternate embodiments, these compositions could also be pre-cast into decorative and lightweight structural objects, such as decorative architectural objects, pedestals, flower pots, lawn ornaments, and the like.

While the principles of the disclosure have been described above in connection with preferred embodiments, it is to be clearly understood that this description is made only by way of example and not as a limitation of the scope of the disclosure or the invention as claimed below.

The invention claimed is:

1. A cementitious composition, the cementitious composition having a total weight, the cementitious composition comprising:
   a binder in an amount of between 2.5-10% by weight of the total weight of the cementitious composition, the binder comprising Portland Cement;
   a disperser in an amount of between 20-60% by weight of the total weight of the cementitious composition; and
   a waste material composition, the waste material composition having a weight, wherein the waste material composition includes Recovered Screen Materials in an amount of between 50-100% by weight of the weight of the waste material composition.

2. The cementitious composition of claim 1, wherein the waste material composition includes Mixed Glass Fines in an amount of between 0.01-50% by weight of the weight of the waste material composition.

3. The cementitious composition of claim 2, wherein the Mixed Glass Fines are present in an amount of between 15-25% by weight of the weight of the waste material composition.

4. The cementitious composition of claim 1, wherein the waste material composition includes foundry sand in an amount of between 0.01-20% by weight of the weight of the waste material composition.

5. The cementitious composition of claim 1, wherein the Recovered Screen Materials are present in an amount of between 70-98% by weight of the weight of the waste material composition.

6. The cementitious composition of claim 1, wherein the Recovered Screen Materials are present in an amount of between 75-85% by weight of the weight of the waste material composition.

7. The cementitious composition of claim 6, wherein the waste material composition includes Mixed Glass Fines in an amount of between 15-25% by weight of the weight of the waste material composition.

8. The cementitious composition of claim 1, wherein the disperser is water.

9. The cementitious composition of claim 1, wherein the Portland Cement is present in an amount of between 2.5-5% by weight of the total weight of the cementitious composition.

10. The cementitious composition of claim 1, the binder further comprising a pozzolan.

11. The cementitious composition of claim 10, wherein the pozzolan is present in an amount of between 0.1-5% by weight of the total weight of the cementitious composition.

12. The cementitious composition of claim 11, wherein the pozzolan is metakaolin and/or fly ash.

13. The cementitious composition of claim 1, the binder further comprising a modified alkali silicate.

14. The cementitious composition of claim 13, wherein the modified alkali silicate is present in an amount of between 0.01-2% by weight of the total weight of the cementitious composition.

15. The cementitious composition of claim 1, further comprising an accelerant.

16. The cementitious composition of claim 15, wherein the accelerant is present in an amount of between 0.01-1% by weight of the total weight of the cementitious composition.

17. The cementitious composition of claim 15, wherein the accelerant is present in an amount of between 0.01-0.10% by weight of the total weight of the cementitious composition.

18. The cementitious composition of claim 17, wherein the accelerant is present in an amount of between 0.01-0.10% by weight of the total weight of the cementitious composition.

19. The cementitious composition of claim 15, wherein the accelerant is calcium chloride or calcium nitrate.

20. A method of utilizing the cementitious composition of claim 1 as a stable fill or levelling material on a plot of land.

* * * * *